United States Patent [19]

Stemme et al.

[11] 4,108,542

[45] Aug. 22, 1978

[54] MOTION-PICTURE CAMERA FOR CASSETTE-LOADED FILM

[75] Inventors: Otto Stemme, Munich; Peter Lermann, Feldkirchen; Alfred Winkler, Munich, all of Fed. Rep. of Germany

[73] Assignee: Agfa-Gevaert AG, Leverkusen, Fed. Rep. of Germany

[21] Appl. No.: 752,312

[22] Filed: Dec. 20, 1976

[30] Foreign Application Priority Data

Dec. 19, 1975 [DE] Fed. Rep. of Germany ....... 2557274

[51] Int. Cl.² .............................................. G03B 23/02
[52] U.S. Cl. .................................... 352/72; 352/133; 354/275
[58] Field of Search ............... 352/72, 78 R, 133, 123; 240/37.1; 354/275, 288

[56] References Cited

U.S. PATENT DOCUMENTS

| 2,123,495 | 7/1938 | Becker | 352/78 R |
|---|---|---|---|
| 2,326,980 | 8/1943 | Steiner | 352/72 |

OTHER PUBLICATIONS

Serial No. 122,145, Pub. 5-4-43, Alien Property Custodian, Storch, 352-78 R.

Primary Examiner—Monroe H. Hayes
Attorney, Agent, or Firm—Michael J. Striker

[57] ABSTRACT

A motion-picture camera has a housing provided with a chamber having a film compartment. A plate-shaped carrier is detachably mountable in this chamber and can carry one or two film cassettes, so that one cassette is located within and the other cassette is located without the film compartment. A movable cover closes an open side of the chamber.

15 Claims, 5 Drawing Figures

MOTION-PICTURE CAMERA FOR CASSETTE-LOADED FILM

BACKGROUND OF THE INVENTION

This invention relates to cameras in general, and more particularly to motion-picture cameras.

In particular, the invention relates to motion-picture cameras of the type using cassette-loaded film.

Such cameras are usually intended for amateur use and employ film magazines of the cassette type which are loaded with 8 mm or super-8 mm motion-picture film. To be compatible with the mechanism of the camera and with other equipment, for example equipment used in film processing laboratories, such cassettes can have only a limited size and accommodate only a limited film footage. Motion-picture film amateurs, however, are prone to running out of film as they take sequences of shots which bring them close to the end of the film in a cassette and then forget, in the excitement of the moment, to obtain a new cassette and carry it with them in preparation for the next shooting sequence.

Many opportunities for good photography have been missed in this manner, for lack of fresh film.

SUMMARY OF THE INVENTION

It is an object of this invention to overcome the aforementioned disadvantages.

More particularly, it is an object of the invention to provide a motion-picture camera which is capable of accommodating, at one and the same time, two separate film cassettes each of which can be selectively placed into a picture-taking position.

Another object is to provide a camera of the type in question wherein that one of the two cassettes which is not in picture-taking position, can be removed and/or replaced without thereby interfering with the cassette which is in picture-taking position.

A concomitant object of the invention is to provide a camera of this type which can, but need not, accommodate both cassettes at the same time, and outer dimensions and/or contours of which can be varied in dependence upon whether the camera accommodates only one or both of the cassettes at a given time.

Pursuant to these objects and others which will become apparent hereafter, one feature of the invention resides in a motion-picture camera for use with motion-picture film that is loaded in cassettes. The novel camera has a housing provided with a chamber and includes a carrier which is removably mountable in this chamber. The carrier is provided with means for selectively mounting thereon a first and a second film cassette. The chamber has an open side which is closable by a cover. A portion of the chamber constitutes a film compartment and one or the other of the film cassettes mounted on the carrier will always be located in this film compartment. The cover is advantageously so constructed and/or mounted that it can assume two end positions — depending upon whether only one or two of the cassettes are mounted on the carrier —0 in each of which the outer dimensions and/or contours of the camera housing differ from one another.

The novel features which are considered as characteristic for the invention are set forth in particular in the appended claims. The invention itself, however, both as to its construction and its method of operation, together with additional objects and advantages thereof, will be best understood from the following description of the specific embodiments when read in connection with the accompanying drawings.

DESCRIPTION OF THE PREFERRED EMBODIMENTS

Figure 1:
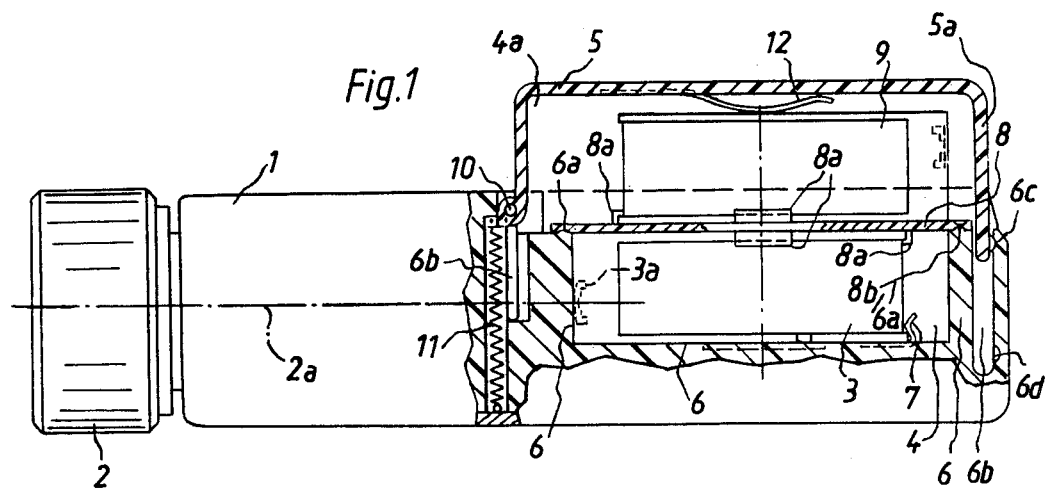
FIG. 1 is a fragmentary longitudinal section through a motion-picture film camera embodying the invention.
Figure 2:
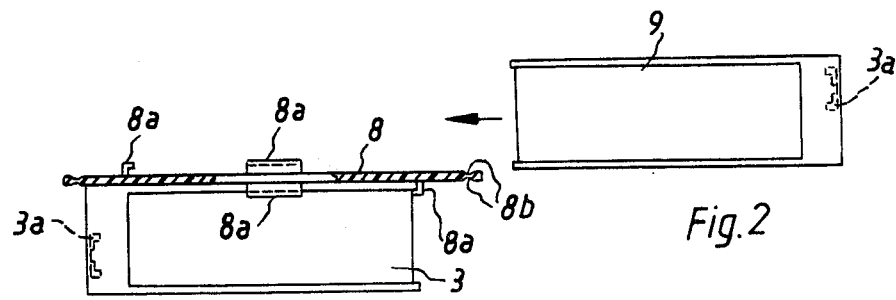
FIG. 2 shows sectioned parts of the camera of FIG. 1, in an exploded view.
Figure 3:
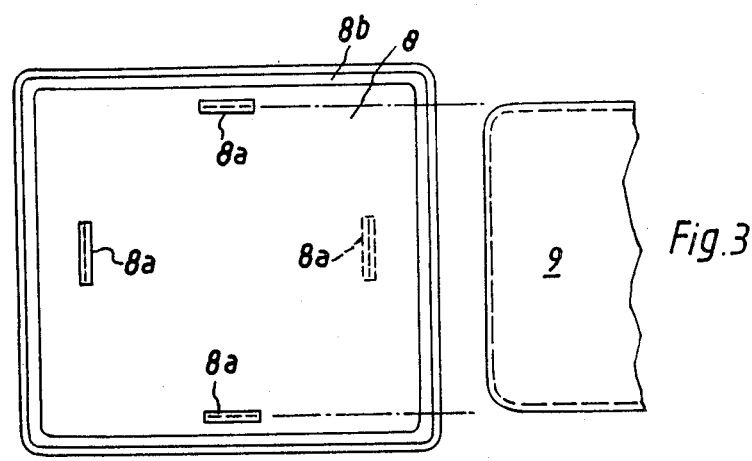
FIG. 3 is a partial top-plan view of FIG. 2.

The drawing shows in FIGS. 1-3 one exemplary embodiment of the invention.

The camera housing itself is identified with reference numeral 1. It has the usual objective or lens system 2 of which no details are given since they are not germaine to the concept of the invention.

Camera housing 1 is formed with a film compartment 4 which is closed at its open side by a cover 5 and forms with the interior 4a thereof a chamber. Film compartment 4 is intended to accommodate a film cassette 3; it is bounded by lateral walls 6 and, opposite its open side, by a bottom wall which is provided with a biasing element 7, e.g. a leaf-type spring, for the cassette which is accommodated in the compartment 4.

The camera has a cassette carrier 8 which is essentially plate-like in configuration; both of the major surfaces of carrier 8 are provided with rails 8a or analogous holding members which can engage and hold a film cassette. Peripheral edge portions of the carrier 8 are provided in both major surfaces with elongated grooves 8b.

The purpose of the grooves 8b is to provide a seal against the entry of light into the film compartment 4. For this purpose the grooves 8b cooperate with beads 6a or analogous elongated projections which are provided at the free edges of the walls 6 so that, when the carrier is in the position shown in FIG. 1, the beads 6a each become lodged in one of the grooves 8b and form therewith a labyrinth-type seal.

Since both major surfaces of the carrier 8 are provided with the holding members 8a, the user has the option of mounting a single film cassette 3 on one of these surfaces and having the other surface free, or of mounting film cassettes 3 and 9 on the respective major surfaces. It is important to note that the holding members 8a on one of these surfaces are so offset relative to the holding members 8a on the other major surface, that the cassettes 3 and 9 are also offset relative to one another. Thus, the cassettes 3, 9 are held in offset relationship; also, they are mounted in end-for-end reversed relationship, as FIG. 1 shows. Whichever film cassette is located in the compartment 4, i.e., in FIG. 1 the cassette 3, is so positioned that its exposure window 3a faces toward the objective 2 and is located on the optical axis of the same, being pressed against the camera wall by the spring 7. Thus, one of the cassettes is always in the operative position and which one of the cassettes 3, 9 on carrier 8 is to be in this position is a matter is at the option of the user.

Of course, the chamber of the camera must be shaped and dimensioned to permit the presence of the second cassette, i.e. in FIG. 1 the cassette 9. This means that the cover 5 must be appropriately shaped and dimensioned. This cover could simply be provided with a biasing element, e.g. with a spring, which is no positioned that when the cover is in closed position the biasing element presses the carrier 8 against the beads 6a so that the same form with the cooperating grooves the labyrinth-type seal mentioned earlier.

A currently preferred solution, however, proposes to make the cover displaceable between two closed positions, one of which it can assume when space is required for the presence of both the cassettes 3 and 9, and the other of which it can assume when space is required only for the cassette 3, i.e. for the cassette which is located in the film chamber.

As shown in FIG. 1, the cover 1 may be cupped — or generally box-shaped —; it has peripheral walls 5a the free edge portions of which enter — when the cover is closed — into an annular groove 6b formed in the housing 1 circumferentially of the film compartment 4. Cover 5 includes a pivot 10 which is slidable in a part of this groove 6b, in a direction normal to the plane of the open side of compartment 4 — and hence normal to the plane of carrier 8. Biasing means are provided, for example in form of a contraction spring 11 having its opposite ends connected to cover 5 or pivot 10 and in the groove 6b, respectively; such biasing means serve to permanently urge the pivot 10 inwardly away from the plane of the open side of compartment 4.

The inner side of cover 5 carries a pressure spring 12 which, when the cover is in the closed position of FIG. 1 and the carrier supports both of the cassettes 3, 9, presses against the cassette 9 and urges the carrier 8 firmly against the beads 6a. In this position, the pivot 10 is as close to the plane of the open side of compartment 4 as it ever gets in normal operation and cover 5 is latched in the closed position by snap-engagement of a lip thereon with a detent 6c of housing 1.

If the carrier supports only one cassette, e.g. cassette 3 which is located in compartment 4, then closing pressure exerted upon the cover by a user allows pivot 10 to slide inwardly in the groove 6b, just as do the peripheral walls of the cover. Such movement continues until the spring 12 now abuts and presses against the carrier 8 directly and the lip of cover 5 moves into snaplocking engagement with another detent 6d of housing 1.

It goes without saying that any of the known latches may be provided for securely latching the cover in closed position until it is desired to open it.

Figure 5:
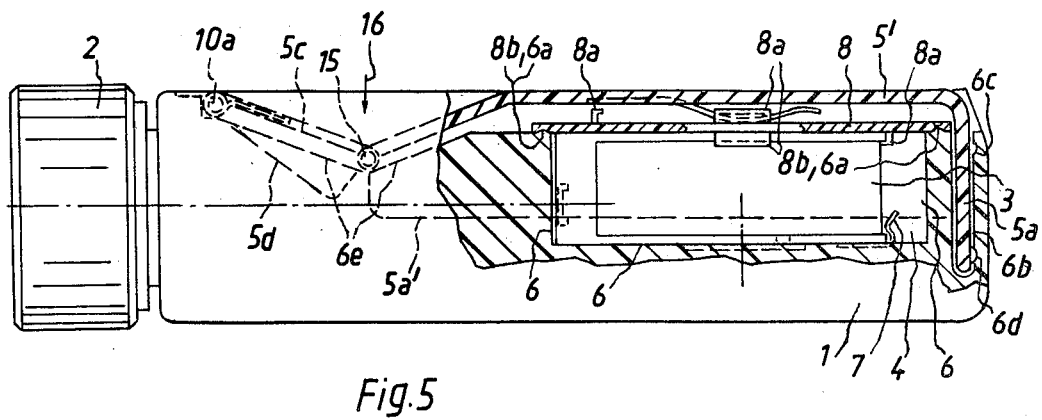
FIG. 5 shows the camera of FIG. 4 with its cover in a different operating position.

FIGS. 5 and 6 shows a somewhat different embodiment, wherein like reference numerals designate the same elements as in the preceding Figures.

Here, however, the cover is different from the one shown in FIG. 1. The cover in FIGS. 4 and 5 has a box-shaped section 5' with walls 5a' which, as before, engage in the groove 6b. The box-shaped section 5' is hinged at 15 to another section 5c which is mounted for turning movement about a pivot 10a; unlike the pivot 10 of FIG. 1, pivot 10a does not slide in groove 6b but is instead mounted on wall 6 of housing 1. Section 5c has side walls 5d which are needed, in conjunction with those of the box-shaped section 5', to prevent the access of light to the chamber.

Figure 4:
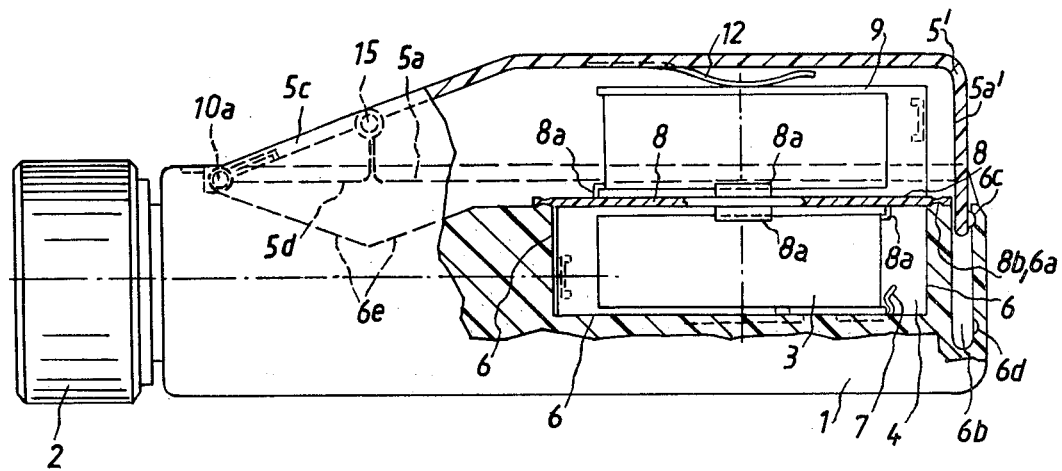
FIG. 4 is a view analogous to that of FIG. 1, but illustrating a different embodiment having a cover which is shown in one operating position.

If, in this embodiment, both of the cassettes 3, 9 are present then the cover 5', 5c assumes the position of FIG. 4 in which the walls 5a', 5d adjoin one another and the cover in effect forms a hood which is latched in position by cooperation with the detent 6c.

If, however, only a single cassette is present, and is located in the film compartment 4, then a slight pressure by the user upon the hinge 15 in direction of the arrow 16, suffices for the sections 5', 5c to become mutually inclined (see FIG. 5), in direction inwardly of the open side of compartment 4. The spring 12 of section 5' then presses against the carrier 8 and section 5' snap-engages with the detent 6d of the housing 1. The outer side of the cover is then formed with the illustrated, substantially V-shaped depression. It goes without saying, of course, that the groove 6b must have appropriate recesses 6e in the region where the sections 5', 5c folds inwardly to make such folding possible.

It will be seen that in both exemplary embodiments the external contour and dimensions of the camera change, depending upon in which position the respective cover is located.

The invention is susceptible of various modifications. Thus, the shape of the cover need not be as shown in the drawings, and biasing means other than the illustrated springs could be provided. Carrier 8 and the cover could be made of metal or synthetic plastic material and the detent arrangements could be other than those which have been illustrated.

It will be understood that each of the elements described above, or two or more together, may also find a useful application in other types of applications, differing from the types described above.

While the invention has been illustrated and described as embodied in a motion-picture camera, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. In a motion picture camera for use with cassette-loaded film, a combination comprising
   a camera housing provided with an internal chamber and having a surface formed with an access opening for said chamber;
   a carrier removably mountable in said chamber;
   first means for selectively mounting on said carrier one film cassette to be located in said chamber and another film cassette which at least in part projects through said opening and beyond said surface when the one cassette is located in said opening;
   a cover for said opening; and
   second means mounting said cover on said housing for displacement between a retracted position in which it is substantially flush with said surface and which it can assume in the absence of the other cassette, and an extended position in which is projects beyond said surface and which it assumes in the presence of the other cassette on said carrier.

2. A combination as defined in claim 1, wherein said carrier is a plate member having two major surfaces, said first means being provided on said major surfaces.

3. A combination as defined in claim 2, wherein said first means on one of said major surfaces are offset relative to said first means on the other of said major surfaces, and arranged so that the cassettes are mounted on said plate member offset relative to one another and reversed end-for-end relative to each other.

4. A combination as defined in claim 2, wherein said first means comprise recesses adapted to receive projecting ribs of said cassettes.

5. A combination as defined in claim 2, wherein said first means comprise brackets adapted to receive projecting ribs of said cassettes.

6. A combination as defined in claim 1, said housing comprising walls bounding said chamber and having free edge portions, and said carrier having marginal portions which in use are supported on said free edge portions.

7. A combination as defined in claim 6, wherein said free edge portions and said marginal portions are provided with respective inter-engaging first and second conformations which together form a labyrinth-type seal which seals at least portions of said chamber against the intrusion of light.

8. A combination as defined in claim 7, wherein said first conformations on said free edge portions are grooves, and said second conformations on said marginal portions are mating ribs.

9. A combination as defined in claim 7, wherein said first conformations on said free edge portions are ribs and said second conformations on said marginal portions are mating grooves.

10. A combination as defined in claim 7, said camera having a plurality of components which cooperate with film located in said chamber; and wherein said mounting means and conformations are arranged so that when said carrier is mounted in said chamber said one cassette received in said chamber is so located that film in said one cassette is positioned to cooperate with said components.

11. A combination as defined in claim 1, said cover being cupped and having a circumferential wall; and said housing having grooves which are recessed therein in direction away from said surface said circumferential wall extending into said grooves to a lesser or greater depth depending upon whether said cover is in said retracted or in said extended position.

12. A combination as defined in claim 11, said cover including a pivot hinge received in one of said grooves and slidable therein towards and away from said surface; and further comprising biasing means urging said pivot hinge in direction away from said surface.

13. A combination as defined in claim 12, wherein said biasing means comprises a tension spring connected to said pivot hinge.

14. A combination as defined in claim 11, wherein said cover comprises two sections which are hingedly connected with one another, said cover having an outer transverse wall extending substantially normal to said circumferential wall and including two parts each provided on one of said sections, said parts being substantially coplanar when said cover is in said extended position and being inclined towards each other and inwardly of said surface when said cover is in said retracted position.

15. In a variable-dimension motion picture camera for use with cassette-loaded film, a combination comprising
 a camera housing provided with an internal chamber and having a surface formed with an access opening for said chamber;
 a plate-shaped carrier removably mountable in said chamber and;
 means for selectively mounting on said carrier one film cassette to be located in said chamber and an other film cassette which at least in part projects through said opening and beyond said surface when the one cassette is located in said opening so that the exterior dimensions of said camera are decreased in the absence of said other film cassette from said carrier.

* * * * *